(12) United States Patent
Yeong et al.

(10) Patent No.: US 8,445,065 B2
(45) Date of Patent: May 21, 2013

(54) METHOD, PRINTING DEVICE, AND FORMULATIONS FOR DECORATING GLASS OR CERAMIC ITEMS

(75) Inventors: Kay K. Yeong, Letchworth (GB); Thomas Hirt, Rebstein (CH); James E. Fox, Cambridge (GB)

(73) Assignee: Xennia Technology Limited, Letchworth, Hertfordshire (GB)

( * ) Notice: Subject to any disclaimer, the term of this patent is extended or adjusted under 35 U.S.C. 154(b) by 423 days.

(21) Appl. No.: 12/527,710

(22) PCT Filed: Dec. 12, 2007

(86) PCT No.: PCT/EP2007/010850
§ 371 (c)(1),
(2), (4) Date: Nov. 6, 2009

(87) PCT Pub. No.: WO2008/101539
PCT Pub. Date: Aug. 28, 2008

(65) Prior Publication Data
US 2010/0098952 A1    Apr. 22, 2010

(30) Foreign Application Priority Data

Feb. 19, 2007  (DE) .......................... 10 2007 008 443

(51) Int. Cl.
*B05D 1/36* (2006.01)
(52) U.S. Cl.
USPC ............ 427/269; 427/258; 427/279; 427/287

(58) Field of Classification Search
USPC .................... 427/258, 269, 279, 287
See application file for complete search history.

(56) References Cited

U.S. PATENT DOCUMENTS

| | | | |
|---|---|---|---|
| 4,195,104 A * | 3/1980 | Fell ............................ | 427/261 |
| 4,420,501 A | 12/1983 | Ueda et al. | |
| 5,891,520 A * | 4/1999 | Makar et al. ................. | 427/269 |
| 6,694,885 B2 * | 2/2004 | Geddes et al. ............... | 101/491 |
| 2002/0068131 A1 * | 6/2002 | Secrest et al. ............ | 427/376.1 |

FOREIGN PATENT DOCUMENTS

| | | | |
|---|---|---|---|
| FR | 2750419 | | 1/1998 |
| JP | 2004099432 | | 4/2004 |
| JP | 2005-170705 | * | 6/2005 |
| JP | 2005170705 | | 6/2005 |
| WO | 9215648 | | 9/1992 |

OTHER PUBLICATIONS

Official action dated Oct. 16, 2012 for JP 2009-549781.

* cited by examiner

*Primary Examiner* — Frederick Parker
(74) *Attorney, Agent, or Firm* — Bachman & LaPointe, P.C.

(57) ABSTRACT

A method and a printing device (6) for decorating glass or ceramic items, wherein a pigment layer (3) is sandwiched between two glass frit layers (2, 4), wherein at least the pigment formulation layer (3) and the upper glass frit formulation layer (4) are, or can be, imprinted by an inkjet printing process.

4 Claims, 5 Drawing Sheets

METHOD, PRINTING DEVICE, AND FORMULATIONS FOR DECORATING GLASS OR CERAMIC ITEMS

BACKGROUND OF THE INVENTION

This invention relates to a process for decorating glass or ceramic articles, to a printing apparatus for decorating glass or ceramic articles to a glass frit formulation, to a pigment formulation, to a combination of a glass frit formulation and of a pigment formulation, to a decorated glass or ceramic article, and also to a transfer medium for use in decorating a glass or ceramic article.

U.S. Pat. No. 6,694,885 B2 discloses a process for preparing a ceramic decal wherein a transfer medium has initially applied to it a flux layer by means of adhesives and then a color image is printed onto the flux layer by means of a thermal transfer printing process. Disposed above the color image is a flux protective layer. Optionally, an opacification layer and also a further flux-adhesive layer may be applied underneath the color image layer. Owing to the use of a thermal transfer printer, the composition of the layers to be applied has to meet special requirements. For example, the flux layers have to contain wax compounds. Thermal transfer printing is comparatively tricky to handle, inter alia owing to the necessary use of ink ribbons.

JP 2004-99432 A discloses a process wherein a substrate has initially applied to it a glass frit layer and the glass frit layer is then printed with a pigment layer by means of an inkjet printer, whereupon the substrate with the two layers is heated, i.e., fired, to melt the glass frit layer. Owing to the provision of the lower glass frit layer, good adherence of the printed image layer to the substrate is ensured. One disadvantage with the existing process is that the final product leaves something to be desired in terms of gloss/luster and surface finish.

This invention therefore has for its object to propose a process for decorating glass or ceramic articles whereby high-quality, in particular high-definition, decorations having a lustrous and smooth surface are obtainable. More particularly, the process shall be economical to use with small as well as large batches. The object further consists in proposing a printing apparatus for decorating glass or ceramic articles whereby glass or ceramic articles can be decorated to a high standard. More particularly, the printing apparatus shall enable small as well as large batches to be decorated economically. It is a further object to propose a glass frit formulation and also a pigment formulation for a high-quality decoration of glass or ceramic articles that are suitable for being applied by printing in an inkjet printing operation. It is a further object to propose a decorated glass or ceramic article and also a transfer medium which is useful in the decoration of glass or ceramic articles.

SUMMARY OF THE INVENTION

With regard to the process, which is preferably suitable for decorating crockery or drinking glasses, the object is achieved by the following steps:
(1) coating a substrate by:
   (a) applying a lower layer of a glass frit formulation by a screen printing process or by an inkjet printing operation;
   (b) applying an image as at least one layer of at least one pigment formulation directly to the lower layer of the glass frit formulation by an inkjet printing operation;
   (c) applying an upper layer of a glass frit formulation to the layer of at least one pigment formulation by an inkjet printing operation;
(2) heating the glass or ceramic article with the layers at least to melting temperature of the glass frit particles of the lower and upper layers.

The printing apparatus comprises at least one printhead arrangement with at least one printhead supplied with a glass frit formulation and with at least one printhead supplied with a pigment formulation, wherein the printhead arrangement is movable relative to a substrate to be printed, along a transportation axis and also transversely thereto along a printing axis.

With regard to the glass frit formulation, the object is achieved by providing a formulation comprising:
(a) glass frit particles having a melting temperature from a temperature range from about 500° C. to about 1200° C.,
(b) a glass frit particle weight fraction of between about 20% and about 60%,
(c) a settling rate of the glass frit particles of not more than 1 mm/min,
(d) a viscosity of about 0.002-about 0.05 Pas at a temperature from a temperature range between about 20° C. and about 40° C.,
(e) at least one dispersant, and
(f) at least one solvent.

With regard to the pigment formulation, the object is achieved by providing a formulation comprising:
(a) at least one inorganic pigment,
(b) a pigment weight fraction between about 20% and about 60%,
(c) a settling rate of the pigment of not more than 1 mm/min,
(d) a viscosity of about 0.002 Pas to about 0.05 Pas at a temperature from a temperature range between about 20° C. and about 40° C.,
(e) at least one dispersant, and
(f) at least one solvent.

BRIEF DESCRIPTION OF THE DRAWINGS

Exemplary embodiments of the invention will now be described hereinafter with reference to the drawings. Said drawings are not necessarily intended to be a true-to-scale representation of the exemplary embodiments; on the contrary, the drawings, where they serve to describe the invention, are presented in schematic and/or slightly distorted form. With regard to additions to the teachings which are immediately apparent from the drawings, reference is made to the relevant prior art. It should be borne in mind in this regard that a broad range of modifications and alterations concerning the form and the detail of an embodiment can be carried out without departing from the general idea of the invention. The features of the invention that are disclosed in the foregoing description, in the drawings and in the claims can be instrumental, both individually and in any desired combination, to developing the invention. All combinations of at least two of the features that are disclosed in the foregoing description, in the drawings and/or in the claims also come within the scope of the invention. The general idea of the invention is not limited to the exact form or the detail of the preferred embodiment shown and described hereinafter or limited to subject matter which would be restricted compared to the subject matter claimed in the claims. For specified ranges of dimensions, values lying within the mentioned limits are intended also to be disclosed as limit values and to be able to be used and claimed as desired.

DETAILED DESCRIPTION

Figure 1:
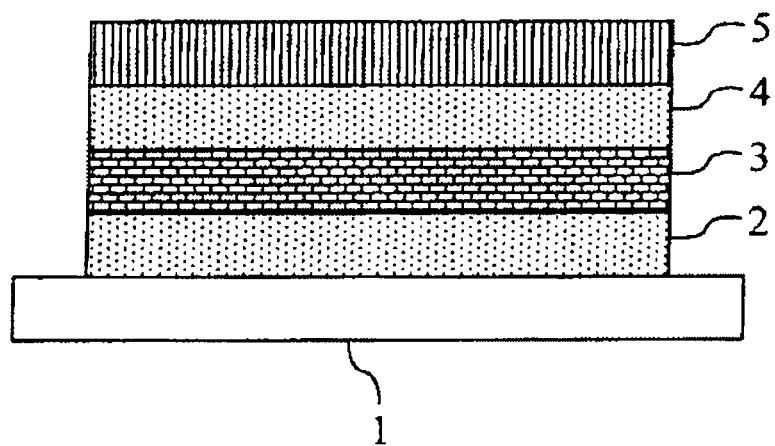
FIG. 1 shows a substrate printed with four superposed layers.

Further developments of the invention are recited in the subclaims. The invention further encompasses all combinations of two or more of the features disclosed in the description, the claims and/or the figures.

Particularly with regard to the process for decorating glass or ceramic articles, the invention is based on the idea of printing not only the layer of at least one pigment formulation, i.e., the layer forming the actual image, and the upper, glass frit formulation layer applied thereto by means of an inkjet printing operation. By using inkjet printing operations it is possible to realize high resolutions good contrasts and also altogether high-value finely distributed layers. Moreover, even small glass or ceramic article batches can be printed economically. The lower layer to be applied, which is composed of the glass frit formulation, can be applied by means of a screen printing process for example, in particular directly to the substrate, although it is preferable to use an inkjet printing operation for this as well. The process concludes with a firing operation wherein the glass or ceramic article is fired with all layers at a temperature in a range between 500° C. and 1200° C. The temperature reached has to be at least equal to the melting temperature of the glass frit particles in the two glass frit layers. According to the invention, the lower and upper glass frit layers can be formed using the same glass frit formulation or different glass frit formulations. Preferably, the glass frit formulation layers are pigment-free.

The sandwichlike layered construction, i.e., the embedding of the layer of at least one pigment formulation (imaging layer) between two glass frit formulation layers, which preferably comprise the only glass frit formulation layers, provides multiple advantages. The lowermost glass frit layer on the glass or ceramic article ensures good adherence of the layered construction to the glass or ceramic article. The ultimately upper glass frit formulation layer protects the underlying pigment formulation layer, which preferably comprises the only layer of at least one pigment formulation, and also ensures high luster and a smooth surface. An alternative in accordance with the invention is for multiple layers, each consisting of at least one pigment formulation, to be arranged directly one above the other, in which case these layers are then framed by in each case one layer of a glass frit formulation.

In a first alternative, the substrate directly comprises the glass or ceramic article to be decorated. In this case, the above-described order in which the two glass frit layers and the at least one pigment layer are printed corresponds to the order of the layers on the end product. Directly on the glass or ceramic substrate there is thus, as an adhesion promoter, the lower glass frit formulation layer, which is preferably applied to the substrate in an inkjet printing operation. The second layer comprises the at least one (imaging) layer formed from one or more pigment formulations and applied according to the invention by means of an inkjet printing operation. Above this printed pigment formulation layer there is disposed the upper layer of the at least one glass frit formulation. In a further development of the invention, this upper layer may comprise the uppermost, i.e., last, layer.

In an elaboration of the invention, the upper glass frit formulation layer comprises not the last layer but the layer to which a last protective layer comprising a protective layer formulation, particularly a varnish layer is applied. It is of particular advantage for the quality of the end product when this fourth layer is likewise applied by means of an inkjet printing operation. The protective layer is preferably constituted such that it burns/evaporates in the final heating operation without leaving a residue. The protective layer is preferably constructed such that it at least partly liquefies at as low a temperature as a temperature between about 200° C. and about 400° C., i.e., below the melting temperature of the glass frit layers, and thus ensures cohesion of the layers disposed thereunder. Preference is given to an embodiment where there is no further layer provided between the lower layer consisting of the glass frit formulation, and the glass or ceramic article; that is, the lower layer of the glass frit formulation accordingly forms the lowermost layer on the glass or ceramic article.

There are two possible ways of constructing the uppermost layer. Either the uppermost layer is formed by the upper layer of glass frit formulation or by the optional protective layer, which is present on the upper layer of glass frit formulation, in which case the second (sole) imaging layer is formed either from a single pigment formulation or from multiple pigment formulations. In the event that this layer consists of multiple pigment formulations, the different pigment formulations can be disposed layerwise, i.e., largely as underlayers of the second layer, or be mixed with each or one another juxtaposed. It is similarly conceivable to provide multiple, particularly two, layers of, in each case, at least one pigment formulation between the two glass frit layers. However, preference is given to an embodiment featuring a single layer of a pigment formulation, i.e., an embodiment having altogether three layers (without protective layer) or having four layers (with protective layer).

In a second alternative, the substrate does not directly comprise the product actually to be decorated, i.e., the glass or ceramic article to be decorated, but a transfer medium, for example a water slide decal paper. Preferably, the layered arrangement is detached from the transfer medium, in particular in a water bath, and applied to the glass or ceramic article to be decorated only after all the layers have been applied to this transfer medium, whereupon the heating operation, i.e., the firing to melt the glass frit layers, then takes place.

The transference or application of the layered arrangement to the glass or ceramic article can be effected by the layer applied first to the transfer medium also forming the lowermost layer on the glass or ceramic article, or by inverting the layers as it were and the layer applied, in particular by printing, last forming the lowermost layer on the glass or ceramic article. The version described last is preferred (best mode).

An elaboration of the invention, particularly to protect the layered arrangement in the course of detachment, provides that the detachment of the layers from the transfer medium is preceded by a protective layer, particularly a varnish layer being applied, preferably by means of an inkjet printing operation, to the upper layer of glass frit formulation. This last-applied layer, which is the upper layer on the transfer medium, then preferably also forms the uppermost layer (protective layer) on the glass or ceramic article.

Alternatively to applying the protective layer to the transfer medium as uppermost layer, the protective layer can be applied as lowermost layer, i.e., directly to the transfer medium, in which case this first-applied, preferably printed, protective layer has applied to it the sandwich formed from the two glass frit layers and the at least one pigment layer therebetween. In this case, the glass frit layer applied last forms the lowermost layer on the glass or ceramic article to be decorated. This ensures that the protective layer is top side on the glass or ceramic article and thus is able to combust/evaporate without leaving a residue and without any superior layers being damaged in the course of this combustion/evaporation.

The last-described embodiment featuring a protective layer directly disposed on the transfer medium provides significant advantages. For instance, it is possible to provide a transfer medium with a protective layer on a large industrial scale and to use this optimized transfer medium as a basis for printing. If desired, it is even conceivable to provide the transfer medium on a large industrial scale not just with a protective layer, but additionally also with the lower layer of glass frit formulation, in which case the two layers are preferably dried and interveningly stored and only printed on demand with the pigment layer and the upper layer of glass frit formulation by means of an inkjet printing operation. Applying the protective layer to the transfer medium need not necessarily be carried out in an inkjet printing operation, but can be effected by means of a screen printing process for example. The same holds for the lower glass frit formulation layer already applied to the protective layer. Such an industrially manufactured transfer medium can be interveningly stored and transported directly to the end user and printed there by means of an inkjet printing apparatus, whereupon the layered arrangement is detached from the transfer medium, applied to the glass or ceramic article and then fired together with the glass or ceramic article. It is similarly conceivable to provide a transfer medium on which the lower layer of glass frit formulation was applied on a large industrial scale, for example by means of a screen printing process, as lowermost layer.

With regard to constructing the at least one layer of the at least one pigment formulation there are different possible ways. Particularly for the purposes of improved adhesion promotion to the glass frit layers surrounding the second layer, it is advantageous when glass frit material is mixed into the pigment formulation layer. The glass frit material/glass particles can be directly incorporated into the at least one pigment formulation, so that the pigment formulation is printed together with the glass frit from a conjoint printhead. It is also conceivable to accommodate the glass frit formulation in a separate printhead and to print the pigment formulation and the glass frit formulation simultaneously from printheads arranged side by side.

Particularly for achieving optimum luminosity and optimum color reproduction for the image formed by the pigment formulation layer, by contrast, it is advantageous to print the layer of the at least one pigment formulation (completely) glass particle free, i.e., neither to mix glass frit particles into the actual pigment formulation nor print a glass frit material into the layer simultaneously with the at least one pigment formulation.

To optimize the processing speed, it is advantageous when at least two of the layers to be applied, particularly by printing, are printed wet-on-wet, i.e., at least one of the layers being at least still moist before the next layer is applied to it, particularly by printing.

The quality of the end product can be improved when at least one of the layers is dried and/or cured by irradiation with infrared light in particular before the next layer is applied to it, particularly by printing. For this purpose, preferably at least some layers contain UV-curing materials, particularly at least one resin.

Drying and/or curing preferably takes place immediately after the layer in question has been applied. High processing speeds can be achieved when all the inkjet printing operations, but at least the printing of the at least one layer of the at least one pigment formulation and the printing of the upper layer of the glass frit formulation are carried out in-line. It is also conceivable to apply all the layers in-line, particularly by printing. It is advantageous for the in-line printing of the pigment layer or layers and of the upper frit formulation layer to use a ready-made transfer medium to which a protective layer and/or the lower layer of glass frit formulation has/have already been applied, preferably in an inkjet printing operation.

It is advantageous for in-line manufacture in particular when at least the inkjet printing operations for printing the pigment layer and the upper frit formulation layer, preferably all the inkjet printing operations are carried out by means of a conjoint printhead arrangement which includes different printheads for the different layers. During a movement of the printhead arrangement relative to the substrate to be printed, it is thus possible to print at one and the same time layers side by side and offset in height.

Particularly to carry out the inkjet printing operations of the process described above, the invention proposes a printing apparatus including at least one conjointly displaceable printhead arrangement (a displaceable carriage), the printhead arrangement including at least one printhead supplied with a glass frit formulation and at least one printhead supplied with a pigment formulation. The printheads used preferably comprise drop-on-demand printheads. The printing apparatus described is particularly useful for printing the at least one pigment layer and the upper glass frit formulation layer onto the lower layer of the at least one glass frit formulation layer. If desired, the printing apparatus, or the printhead arrangement of the printing apparatus, can be further developed such that further layers, i.e., the lower layer of glass frit formulation and/or the protective layer are also printable with the conjoint printhead arrangement. To be able to realize a planar print on a substrate, either a glass or ceramic article or a transfer medium, the printhead arrangement is movable relative to the substrate in a transportation direction and also in a printing direction which extends transversely to the transportation direction. These relative movements can be realized either by making exclusively the printhead arrangement or exclusively the substrate displaceable. However, preference is given to an embodiment wherein the printhead arrangement is displaceable exclusively along a printing axis and the substrate along a transportation axis extending by 90° thereto.

Preference is given to an arrangement of the at least one printhead for the glass frit formulation and of the at least one printhead for the pigment formulation wherein the two printheads are disposed one behind the other viewed in the transportation direction of the substrate. When, for example, the printhead arrangement is to be used to print a ready-made transfer medium having a previously applied lower glass frit formulation layer, the printhead for the glass frit formulation is preferably disposed behind the printhead for the pigment formulation viewed in the transportation direction of the substrate in order that the pigment formulation has already been printed when the substrate arrives in the range of the printhead for the glass frit formulation.

When all of the preferably three sandwich layers are to be printed in an inkjet printing operation, it is advantageous when at least one printhead for the/a glass frit formulation is arranged not only before but also behind (viewed in the transportation direction of the substrate) the at least one printhead for the pigment formulation.

When the printhead arrangement is to be used to print the previously elucidated protective layer also, it is advantageous to provide at least one printhead for the protective layer formulation. This printhead for the protective layer formulation is preferably disposed at the frontmost position viewed in the transportation direction of the substrate when the substrate is to be directly printed. When a transfer medium is printed, the arrangement of the printhead for the protective layer formulation depends on whether the protective layer is to be applied as lowermost layer directly to the transfer medium, or whether the protective layer is to be applied to the upper layer of the glass frit formulation. In the latter case, the at least one printhead for the protective layer formulation is preferably disposed frontmost, viewed in the transportation direction of the substrate, otherwise hindmost.

It is further conceivable, additionally or alternatively, to arrange at least one printhead for a protective layer formulation in the printing direction before or behind a printhead for a glass frit formulation. In this case, however, the printhead has to be repeatedly displaced in the printing direction without the substrate being transported in order that superposed layers may be applied.

Preferably, the printing apparatus includes a drying device and/or a curing device for drying and/or curing individual layers before the application of the next layer. It is particularly advantageous to dispose the drying and/or curing device, particularly an IR radiator on the printhead arrangement behind the printheads, viewed in the printing direction, so that a just-printed layer is immediately dried and/or cured by means of the drying and/or curing device.

It is advantageous, particularly for mixing glass frit material into the layer of pigment formulation, to dispose a printhead supplied with glass frit formulation before and/or behind, viewed in the printing direction, the printhead supplied with the pigment formulation. This makes it possible to let at least one glass frit formulation and at least one pigment formulation flow simultaneously into the at least one, preferably only layer of the at least one pigment formulation. However, this arrangement can be omitted, particularly when the pigment formulation layer is made glass frit free.

In a possible embodiment of the invention, the printhead arrangement includes at least two printhead rows arranged one behind the other in the transportation direction, each row of printheads comprising an alternating arrangement of printheads supplied with glass frit formulation and printheads supplied with pigment formulation. In this embodiment, however, a point on the substrate has to be repeatedly traversed by the printing apparatus without the substrate advancing in the transportation direction in between in order that two or more superposed layers may be realized.

Preference is given to an embodiment wherein the printhead arrangement includes at least two rows of printheads arranged one behind the other in the transportation direction and extending along the printing axis, a first row of printheads comprising printheads arranged one behind the other in the printing direction and supplied with different pigment formulations in particular and the second row of printheads comprising (preferably exclusively) printheads supplied with the glass frit formulation. Preferably, there is at least one printhead for cyan, one for magenta, one for yellow and one for black, in which case the layer of the pigment formulations, i.e., the actual image, is prepared by means of at least two and preferably all of the printheads supplied with pigment formulation.

Preferably, at least one row of printheads supplied with protective layer formulation is disposed before and/or behind, viewed in the transportation direction of the substrate relative to the printhead arrangement, the second row of printheads supplied with the glass frit formulation.

When the first layer of the glass frit formulation is to be applied by an inkjet printing operation also, it is advantageous for the printheads with the pigment formulation to have disposed before and behind, viewed in the transportation direction of the substrate, both of their sides one row each of printheads supplied with the or a glass frit formulation.

The invention also proposes a glass frit formulation for use in decorating glass or ceramic particles which by virtue of its composition is suitable for application in an inkjet printing operation, preferably with a printing apparatus as described above. The glass frit formulation of the invention is notable for glass frit particles having a melting temperature from a temperature range between about 500° C. and about 1200° C., preferably between about 750° C. and about 900° C. The glass frit formulation solids weight fraction comprising the glass frit particles is about between 20% and about 60%. It is essential that the settling rate of the solids is not more than 1 millimeter per minute and that the viscosity of the glass frit formulation is in a range between about 0.02 Pas and about 0.05 Pas at a temperature from a range between about 20° C. and about 40° C. The glass frit formulation further comprises at least one dispersant and at least one solvent. The dispersant has the function of ensuring the chemical stability of the glass frit formulation and also of ensuring a low settling rate for the solid constituents. The glass frit formulation thus obtained is particularly suitable for use with inkjet printheads, preferably with drop-on-demand printheads. The composition according to the invention provides a homogeneous dispersion having good redispersibility. Good redispersibility is particularly advantageous when the glass frit formulation is stored for a prolonged period without being commixed. The redispersibility of the glass frit formulation is preferably such that the glass frit formulation is redispersible by 5 minutes of stirring at a stirrer speed of about 120 revolutions per minute. The stability to particle growth is preferably such that the average particle diameter is observed to increase by less than 10% after one week at a temperature of about 45° C. A pumping (recirculating) operation on use of the pigment formulation or of the glass frit formulation in an inkjet printer is sufficient to keep 90% of the included solids in a state of dispersion even after 100 days of operation. To improve this value still further, a stirred insert can be optionally provided in the printing apparatus. The homogeneous dispersion continues to have a positive effect in relation to the actual printing operation, since blockage of the nozzles of the printhead is prevented. The high stability to particle growth further has a positive effect on reducing the blockage tendency of the printing nozzles. These properties ultimately result in an excellent appearance for the decoration and a high ability on the part of the printed layers to withstand light, moisture and other external influences.

One elaboration of the invention advantageously provides that the $d_{50}$ value (meridian of the particle size distribution) of the solids of the glass frit formulation is between about 1 μm and about 10 μm, and preferably the $d_{50}$ value is between about 1 μm and about 5 μm and more preferably it is between about 1 μm and about 2 μm.

To be able to apply the glass frit formulation optimally by means of an inkjet printing operation, preferably with a dropon-demand printhead, it is advantageous when the weight fraction of the overall glass frit formulation which is attributable to the glass frit particles is about between 40% and 60%, preferably about 50%. The weight fraction of dispersant is preferably about between 7% and 18% of the overall weight of the glass frit formulation, preferably about 12.5%. In a particularly advantageous elaboration of the invention, the maximum glass frit particle diameter is about 3 µm, preferably about 2.7 µm. It is particularly advantageous when the maximum glass frit particle diameter is less than 2 µm.

It has been determined as advantageous to use diacetone alcohol as solvent, particularly at a weight fraction between about 30% and about 40%, preferably about 36%. Diacetone alcohol has a good volatilization equilibrium which ensures a reasonable drying time on the substrate and, on the other hand, does not evaporate too rapidly in the printhead nozzles. The surface tension of diacetone alcohol is preferably greater than 30 dyn/cm, as a result of which the glass frit formulation can be printed optimally by means of an inkjet printing operation.

The glass frit formulation preferably contains a polymeric binder, preferably at a weight fraction of about 0.5% to about 2%. It has been determined as advantageous for the stability of the glass frit formulation to use a styrene-acrylic acid copolymer as polymeric binder, or a polymeric binder which comprises a styrene-acrylic acid copolymer.

It is further beneficial to add silica, preferably at a weight fraction between about 0.5% to about 1.5%. The addition of silica has a beneficial effect on the chemical stability of the dispersion by improving the attraction of the dispersant to the glass frit particle surface and thereby slowing or preventing any particle growth. The addition of silica further leads to a lower settling velocity and to the avoidance of flocculation phenomena in that the materials which do settle out are readily redispersible.

A very low viscosity is advantageous for the glass frit formulation. The viscosity is preferably about 0.002 Pas to about 0.03 Pas. The viscosity is more preferably about 0.002 Pas to about 0.02 Pas, each at a temperature from a range between about 20° C. and about 40° C.

Particular preference is given to an embodiment of the glass frit formulation wherein the glass frit formulation is free of pigments.

The invention further proposes a pigment formulation for use in decorating glass or ceramic particles which is notable for excellent suitability for an inkjet printing operation in particular. The pigment formulation according to the invention comprises a particularly homogeneous dispersion that has very good redispersing properties. The pigment formulation is preferably redispersible by 5 minutes of stirring at a stirrer speed of about 120 revolutions per minute. The pigment formulation is further stable to particle growth in that particle growth is preferably less than 10% after one week at a temperature of about 45° C. A pumping (recirculating) operation on use of the pigment formulation or of the glass frit formulation in an inkjet printer is sufficient to keep 90% of the solids dispersed even after 100 days of operation. To improve this value still further, a stirrer insert can be optionally provided. The pigment formulation is by virtue of its homogeneous dispersivity particularly useful for printing with inkjet printheads, in particular drop-on-demand printheads. Blockage of printhead nozzles is advantageously prevented. Furthermore, a layer printed with such a pigment formulation is resistant to light, moisture and other environmental conditions. In addition, the image prepared with this pigment formulation has excellent contrast, high luminosity and also an excellent overall appearance.

The pigment formulation comprises, in accordance with the invention, at least one inorganic pigment. The solids weight fraction (inclusive of the inorganic pigment) is about 20% to about 60%, the settling rate of the solids being not more than 1 millimeter per minute. The viscosity is preferably below 0.05 Pas at a temperature of between about 20° C. and about 40° C. The pigment formulation further comprises at least one dispersant and also a solvent. The dispersant has the function of ensuring good chemical stability and also a low settling velocity for the solid fractions.

The $d_{50}$ value of the particle size distribution of the solids in the pigment formulation in a further development of the invention is between about 1 µm and about 10 µm, preferably between about 1 µm and about 5 µm.

Preference is given to a pigment formulation wherein the weight fraction of the pigment is about 40% to about 60%, preferably about 50% to about 60%. The weight fraction of dispersant is preferably about 8% to about 15% and more preferably about 10% to about 12%. The pigment diameter is preferably not more than about 2.7 µm and more preferably not more than about 1.5 µm. It is particularly preferable for the pigment diameter to be less than 1 µm.

Preference is given to an embodiment wherein diacetone alcohol is used as solvent. Diacetone alcohol has a good volatility equilibrium, making it possible to achieve reasonable drying times on the substrate and at the same time prevent excessively fast evaporation in the nozzles of the printhead. The surface tension of the diacetone alcohol used is preferably more than 30 dyn/cm, making the pigment formulation optimally printable in an inkjet printing operation. The addition of diacetone alcohol further prevents droplet formation and also any settling in or at the printhead.

It is preferable to add a polymeric binder, preferably at a weight fraction between about 0.5% and about 2%. It is particularly advantageous when the polymeric binder comprises or consists of a styrene-acrylic acid polymer.

The addition of silica will prove advantageous, particularly at a weight fraction between about 0.5% and about 1.5%. The silica provides chemical stability to the dispersion by improving the attraction of the dispersant to the pigment surface. This prevents rapid particle growth. Silica further ensures a low settling velocity and prevents flocculation phenomena in that solids which had settled out are readily redispersible owing to the overall composition of the pigment formulation.

It is particularly advantageous when the viscosity is only between about 0.02 Pas and about 0.03 Pas, preferably only between 0.002 Pas and about 0.02 Pas at a temperature between about 20° C. and about 40° C.

One possible version of the pigment formulation comprises glass frit particles at a weight fraction between about 10% and 30%. In a further development of the invention, the maximum glass frit particle diameter is about 3 µm, preferably about 2.7 µm, particularly about 2 µm, more preferably about 1.5 µm or less than 1 µm. It is particularly advantageous when, in a further development of the invention, the $d_{50}$ value of the particle size distribution of the glass frit particles is between about 1 µm and about 10 µm. The $d_{50}$ value of the particle size distribution is preferably between about 1 µm and about 5 µm.

Alternatively, the pigment formulation may be made glass particle free. This embodiment makes it possible to achieve optimal printing qualities with regard to contrast and luminosity.

The protective layer formulation used preferably comprises a varnish layer, particularly with addition of xylene and/or glycol acetate, particularly butyl glycol acetate.

The invention provides not just the glass frit formulation and the pigment formulation each on its own, but additionally also the combination of the glass frit formulation and the pigment formulation for use in decorating glass or ceramic articles, particularly by applying the formulations in an inkjet printing operation. Synergistic interactions between the glass frit formulation and the pigment formulation make it possible to produce high-quality decorations of high contrast and also high resolution/definition.

The invention further relates to a glass or ceramic article coated with the glass frit formulation and also the pigment formulation as previously described and fired.

The invention is further directed to a ready-made transfer medium having a lower protective layer, particularly a varnish layer. Preferably, the first layer of the glass frit formulation has additionally already been applied to the lowermost protective layer. Alternatively, it is conceivable to provide the transfer medium exclusively with the first layer of the glass frit formulation as lowermost layer, in which case the ready-made transfer medium is suitable for printing with a previously described layer, at least a pigment formulation and a previously described layer of a glass frit formulation by means of an inkjet printing operation. Preferably, the layer or layers applied to the transfer medium is/are dried and/or cured in order that the transfer medium may be storable and transportable.

With reference to the drawings, like components and components having the same function bear the same reference symbols in the figures.

Preferred compositions of four different pigment formulations, of the glass frit formulation and of the protective layer formulation are initially described below in Table 1 (best mode).

FIG. 1 shows a substrate 1 which comprises either directly the glass or ceramic article to be decorated, or a transfer medium. A lower layer 2 of a glass frit formulation was applied to the substrate, for example by means of a screen printing process, but preferably by means of an inkjet printing operation. This first layer was preferably dried and/or cured before application of a directly superior layer 3. This pigment layer 3 is formed from multiple pigment formulations. The pigment formulations used have the colors cyan, magenta, yellow and black. All the pigment formulations forming the pigment layer 3 were applied by means of an inkjet printing operation.

An upper layer 4 of a glass frit formulation was applied to the pigment layer 3 by means of an inkjet printing operation, particularly after pigment layer 3 had been dried and/or cured. The glass frit formulation used for the upper glass frit formulation layer preferably comprises the same glass frit formulation as used for forming the lower layer 2. If desired, however, it is also possible to choose a differing glass frit composition. The preferably dried upper layer 4 of the glass frit formulation optionally has applied to it directly a layer 5, preferably by means of an inkjet printing operation. The uppermost layer 5 comprises a varnish layer (protective layer). As a final process step, substrate 1 with the four layers 2, 3, 4, 5 is fired at about 850° C. The uppermost layer 5 (protective layer) liquefies at as low a temperature as about 250° C. to about 350° C., and this layer disappears in the course of the firing operation without leaving a residue.

When substrate 1 as per FIG. 1 comprises a transfer medium, for example a water slide decal paper, the preferably four layers 2, 3, 4, 5 first have to be detached from the substrate 1 in a water bath in particular and applied to the glass

TABLE 1

|  | Cyan pigment formulation | Magenta pigment formulation | Yellow pigment formulation | Black pigment formulation | Glass frit formulation | Protective layer formulation |
|---|---|---|---|---|---|---|
| Solvent: diacetone alcohol | 55.1 | 51.8 | 51.2 | 39.6 | 48.6 |  |
| Dispersant: Disperbyk 168 |  | 8.0 | 8.0 | 9.9 | 10.0 |  |
| Dispersant: Tego Disperse 610S | 3.9 |  |  |  |  |  |
| Binder/resin Joncryl 678 | 1.6 | 0.3 | 0.3 | 1.0 | 0.4 |  |
| Cab-O-Sil M5 silica |  |  | 0.7 |  | 1.2 |  |
| Pigment: Mason Color Vivid Blue 6306 | 39.4 |  |  |  |  |  |
| Pigment: Ferro Magenta 171710 |  | 39.9 |  |  |  |  |
| Pigment: Mason Color Canary Yellow 6410 |  |  | 39.8 |  |  |  |
| Mason Color Black Onyx 6612 |  |  |  | 49.5 |  |  |
| Glass frit: Ferro Frit 10169 |  |  |  |  | 39.8 |  |
| Varnish: Ferro Lacquer 83894 |  |  |  |  |  | 25.0 |
| Xylene |  |  |  |  |  | 58.3 |
| Butyl Glycol Acetate |  |  |  |  |  | 16.7 | or ceramic article to be decorated. It is preferable that the lower layer 2 of the glass frit formulation shall also form the lowermost layer on the glass or ceramic article. If no further layer is disposed above the upper layer 4 of the glass frit formulation, it is also conceivable for the upper layer 4 of the glass frit formulation to form the lowermost layer on the glass or ceramic article to be decorated. What is essential is that one of the layers 2, 4 which surrounds the second layer 3 of the pigment formulations, i.e., a glass frit formulation layer, form the lowermost layer on the glass or ceramic article to be decorated. As a result, the entire layered arrangement adheres optimally to the end product. The glass frit formulation layer which is uppermost following the firing operation ensures a smooth surface and a lustrous appearance for the printed image.

Figure 2:
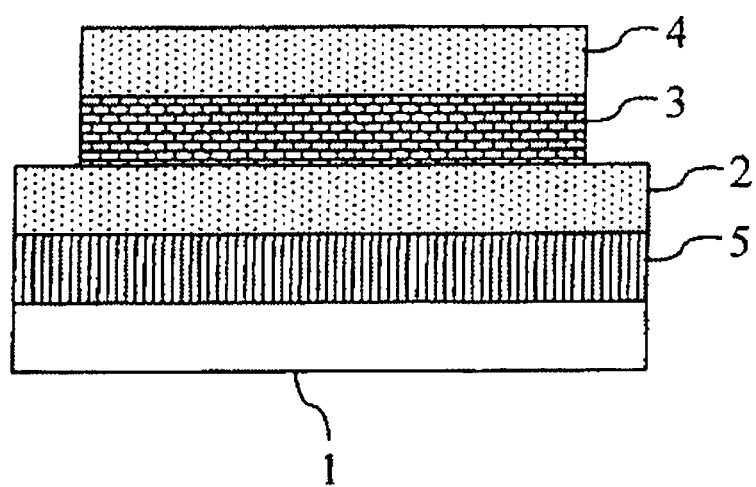
FIG. 2 shows an alternative embodiment of a substrate printed with four layers.

FIG. 2 shows an alternative embodiment of the layered arrangement. In the embodiment of FIG. 2, the substrate disposed at the bottom in the plane of the drawing comprises a transfer medium. A protective layer 5 (protective layer formulation) was applied to this transfer medium as lowermost layer. A screen printing process or an inkjet printing operation is suitable for this for example. This lowermost protective layer 5, particularly after it had been dried and/or cured had a lower layer 2 of a glass frit formulation applied to it, particularly by screen printing or by means of an inkjet printing operation. The dried lower layer of the glass frit formulation was inkjet printed with a layer of at least one pigment formulation, preferably of two or more pigment formulations having the colors cyan, magenta, yellow and black. After the layer 3 of the pigment formulations had dried, this layer had directly applied to it by means of an inkjet printing operation, an upper layer 4 of a glass frit formulation. After the upper layer 4 of the glass frit formulation had dried and/or cured, the layered arrangement consisting of the lowermost protective layer 5, the directly thereabove disposed lower glass frit formulation layer 2, the directly thereabove disposed pigment formulation layer 3 and the directly thereabove disposed upper layer of the glass frit formulation 4 was detached from the substrate 1, particularly in a water bath, and applied to a glass or ceramic article such that the upper layer 4 of the glass frit formulation forms the lowermost layer on the glass or ceramic article.

The layers of at least one pigment formulation 3 and of the upper layer of glass frit formulation applied thereto are preferably applied to the transfer medium 1 ready made with the protective layer 5 and the lower layer 2 of the glass frit formulation 2. This application of layer 3 of the at least one pigment formulation and of the upper layer 4 of the glass frit formulation is preferably effected in-line with a printing apparatus which will be elucidated hereinafter.

Figure 3:
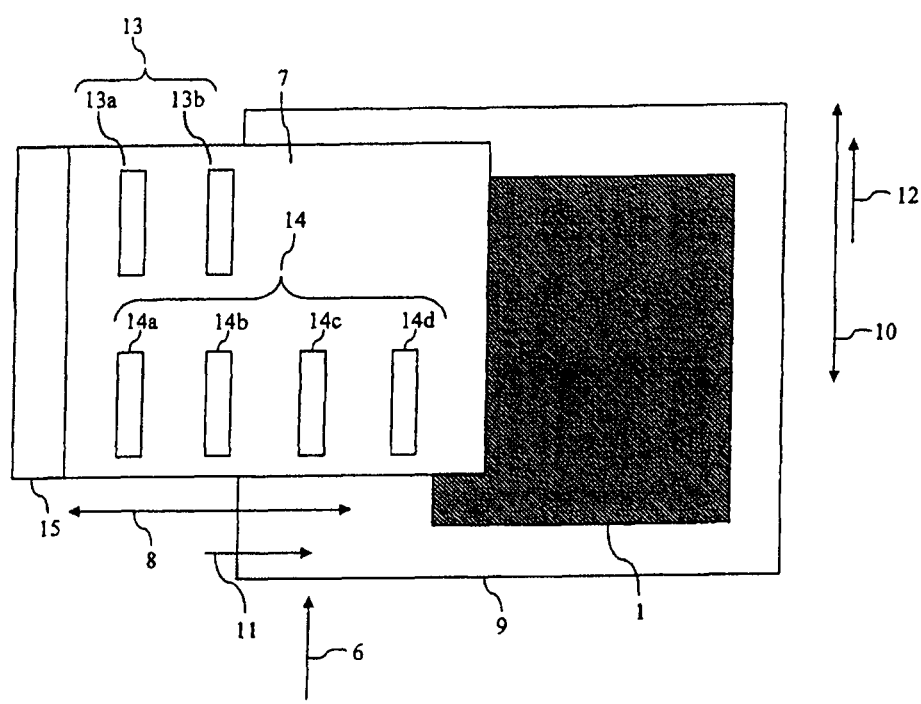
FIG. 3 shows a schematic representation of a printing apparatus with a printhead arrangement and a substrate displaceable in a transportation direction.

FIG. 3 shows a possible construction of such a printing apparatus 6 is schematic form. The printing apparatus 6 comprises a printhead arrangement 7, which is displaceable along a printing axis 8 in the manner of a sliding carriage. A substrate 1 disposed on a transportation belt 9 is displaceable along a transportation axis 10 which extends at right angles to the printing axis 8. In the printing operation, the printhead arrangement 7 is displaced in the printing direction 11 in the exemplary embodiment shown. After a printing operation, i.e., in the course of the printhead arrangement 7 returning along the printing axis 8 in the direction opposite to the printing direction 11, the substrate 1 is displaced in the transportation direction 12. It is also conceivable to print in both printing axis directions, in which case a substrate advance takes place after a printing operation in one of the printing directions has ended.

The printhead arrangement 7 comprises two rows 13, 14 of printheads 13a, 13b and also 14a to 14d, which extend along the printing axis 8 and are disposed one behind the other in the transportation direction 12. All the printheads 13a, 13b and also 14a to 14d comprise drop-on-demand printheads.

The printhead 13a at left in the drawing plane, in row 13 which is the front row in the transportation direction 12 of the substrate, is supplied with a glass frit formulation, while the printhead 13b, arranged adjacently in the plane of the drawing, is supplied with a protective layer formulation.

The printheads 14a to 14d of the second row 14 are supplied with different pigment formulations. Printhead 14a is supplied with a cyan pigment formulation, printhead 14b with a magenta pigment formulation, printhead 14c with a yellow pigment formulation and printhead 14d with a black pigment formulation.

When, for example, the exemplary embodiment depicted in FIG. 1 is to be produced with the printing apparatus 6, the first step is to provide the substrate 1, by means of printhead 13a, with a lower layer 2 of a glass frit formulation; after every printing operation, where the printhead arrangement moves from the left in the plane of the drawing to the right in the plane of the drawing, i.e., in the printing direction 11, the substrate 1 is displaced in the transportation direction 12 by an amount which corresponds to the printhead width.

Thereupon, the substrate 1 is returned in the direction opposite to the transportation direction 12, and a layer of pigment formulations is applied with the synchronously working printheads 14a to 14d in one printing operation. At the same time, an upper glass frit formulation layer 4 is applied from the printhead 13a (one line further up in the plane of the drawing) to the layer of the pigment formulations which was applied in a preceding printing step. Thereupon, substrate 1 is again displaced in the transportation direction 12 by an amount which corresponds to the width of the printheads, whereby the printheads 14a to 14d apply a further layer of pigment formulations and at the same time, by means of printhead 13a, an upper layer 4 of glass frit formulation is applied to the previously applied layer 3 of the pigment formulations, and so on. After substrate 1 has been endowed with the upper glass frit formulation layer in this way, substrate 1 is displaced stepwise in the direction opposite to the transportation direction 12, and the printing of the upper glass frit formulation layer 3 with a protective layer formulation by means of printhead 13b takes place between the transportation steps.

After each layer has been printed, the as-printed layer is dried by means of the automatically co-traveling drying device 15, particularly an infrared radiator.

In an alternative embodiment, not depicted, at least one printhead, preferably a row of printheads, for a glass frit formulation is disposed before as well as behind the row 14 of printheads for the pigment formulations, viewed in the transportation direction 12, in order that not only the lower glass frit formulation layer but also the upper glass frit formulation layer may be printed in-line. Optionally, at least one printhead for applying a protective layer formulation is disposed before or behind, viewed in the transportation direction 12, this sandwich-type arrangement of rows of printheads.

Figure 4:
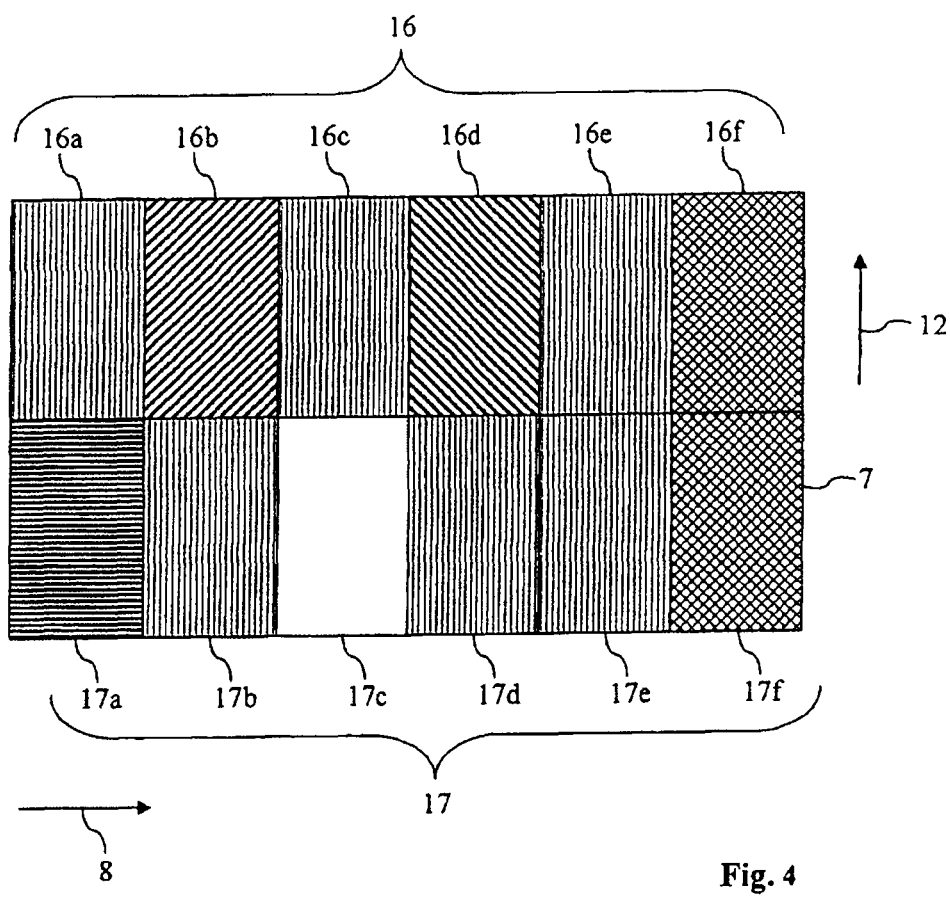
FIG. 4 shows a schematic representation of an alternative printhead arrangement.

FIG. 4 shows an alternative embodiment of a printhead arrangement 7. The printhead arrangement 7 includes two rows 16, 17 of printheads, wherein printheads 16a, 16c and 16e and also printheads 17b, 17d and 17e are each printheads supplied with a glass frit formulation and the printheads 16b, 16d, 17a and 17e are printheads supplied with a pigment formulation, wherein the pigment formulations of the pigment formulations supplied to the printheads 17a, 16b, 17c and 16d have different colors (cyan, magenta, yellow, black). The two printheads 16f and 17f, which are located on the side in the plane of the drawing, are supplied with a protective layer formulation.

Figure 5:
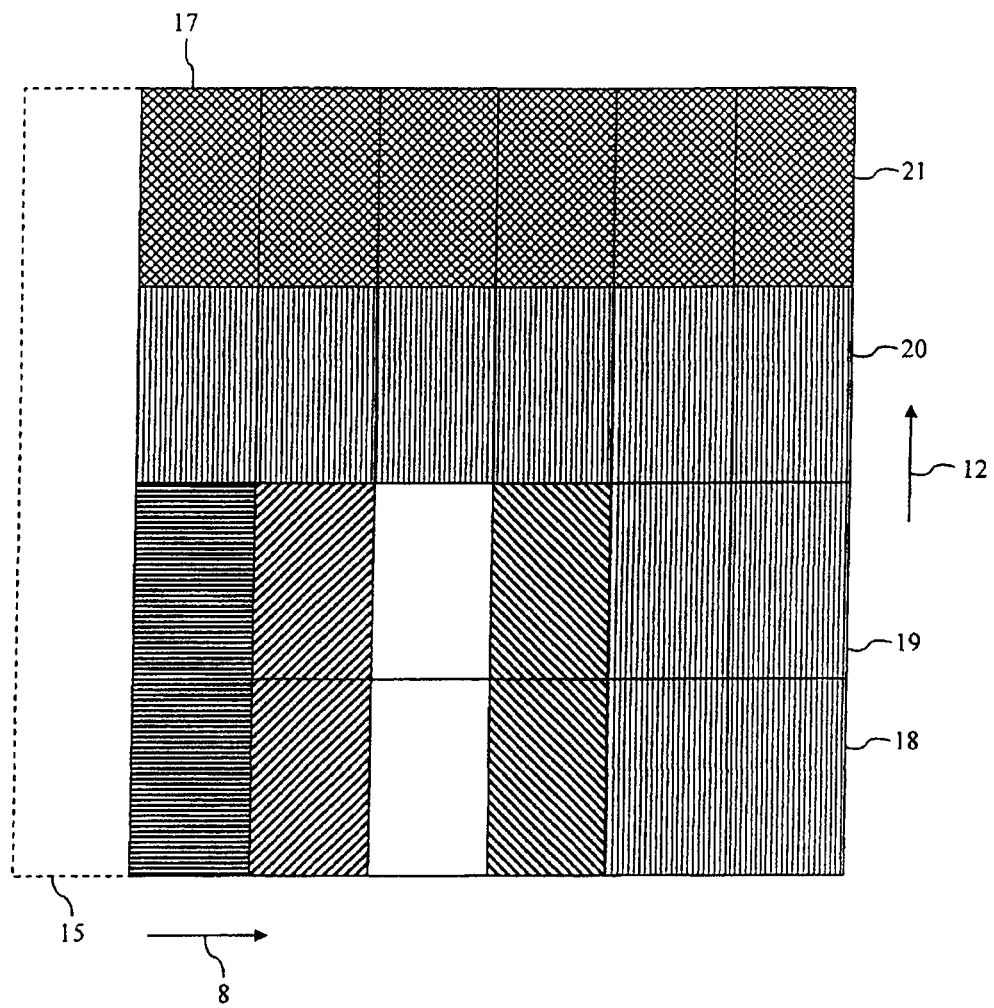
FIG. 5 shows a representation of a further alternative printhead arrangement.

FIG. 5 shows an alternative printhead arrangement 7. This can optionally be additionally equipped with a lateral drying device 15 in particular. The printhead arrangement 7 of FIG. 5 includes four rows 18, 19, 20, 21 of printheads, wherein the two rows 18, 19 each include four printheads arranged side by side in the printing direction 8 and supplied with different pigment formulations. The printhead arrangement shown can be used, inter alia, to print two directly superposed pigment layers, where the pigment layers are enframed by two glass frit layers. In addition to these four printheads in each case there are two printheads for glass frit formulations for mixing glass frit particles into the pigment formulation layers. These (lateral) glass frit formulation printheads can be omitted, if desired. In the plane of the drawing above the rows 16, 17 there is, located in the transportation direction 12, a row 20 which consists of six printheads each exclusively supplied with a glass frit formulation. In the plane of the drawing thereabove (i.e., ahead in the transportation direction 12) there is a row 21 featuring six printheads supplied with the protective layer formulation. Row 21 can be omitted when the explanatory embodiment shown in FIG. 2 is to be produced and the transfer medium is already coated with a protective layer and a lower layer of a glass frit formulation. If desired, multiple independently displaceable printhead arrangements each featuring at least one printhead can also be disposed one behind the other in the transportation direction.

Optionally, a further row of printheads supplied with a glass frit formulation can be provided underneath the row 18 and 19 of printheads, particularly when all the layers are to be printed in-line.

The invention claimed is:

1. A process for decorating glass or ceramic articles, comprising the following process steps:
   (1) applying a series of layers on a substrate comprising a glass or ceramic article by:
      (a) applying a lower layer of a glass frit formulation by printing;
      (b) applying an image as at least one layer of at least one pigment formulation directly to the lower layer of the glass frit formulation by an inkjet printing operation;
      (c) applying an upper layer of a glass frit formulation to the layer of at least one pigment formulation by an inkjet printing operation;
      (d) applying a protective layer comprising a varnish layer to the upper layer of the glass frit formulation by an inkjet printing operation;
   (2) heating the glass or ceramic article onto which the layers have been applied to at least a melting temperature of the glass frit particles of the lower and upper layers.

2. The process according to claim 1, wherein the lower layer of the glass frit formulation is a lowermost layer of the substrate.

3. The process according to claim 1, wherein the protective layer is an uppermost layer of the substrate.

4. The process according to claim 1, wherein the series of layers are prepared on a transfer medium and the layers are detached from the transfer medium and, before the heating, transferred to the glass or ceramic article.

* * * * *